United States Patent
Urabe et al.

(10) Patent No.: US 6,313,209 B2
(45) Date of Patent: Nov. 6, 2001

(54) POLYAMIDE RESIN COMPOSITION AND FILM PRODUCED FROM THE SAME

(75) Inventors: Hiroshi Urabe; Seiji Morimoto; Hiromichi Matsui, all of Hiratsuka (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 0 days.

(21) Appl. No.: 09/785,796

(22) Filed: Feb. 16, 2001

(30) Foreign Application Priority Data

Feb. 18, 2000 (JP) .................................................. 12-040421
Jun. 22, 2000 (JP) .................................................. 12-187432

(51) Int. Cl.$^7$ ............................. C08K 3/34; C08L 77/00; B32B 27/34
(52) U.S. Cl. .......................... 524/447; 524/450; 524/451; 524/493; 524/514; 428/474.4; 428/475.5
(58) Field of Search ..................................... 524/447, 450, 524/451, 493, 514; 428/474.4, 475.5

(56) References Cited

U.S. PATENT DOCUMENTS 5,194,319 * 3/1993 Onaka et al. .
5,414,042 * 5/1995 Yasue et al. .
6,255,378 * 7/2001 Fujimoto et al. .

* cited by examiner

Primary Examiner—Tae H. Yoon
(74) Attorney, Agent, or Firm—David G. Conlin; Lisa Swiszcz Hazzard; Dike, Bronstein, Roberts & Cushman, IP Group

(57) ABSTRACT

The present invention relates to a polyamide resin composition comprising 100 parts by weight of a polyamide resin and 0.001 to 2 parts by weight of at least two kinds of fillers having different average particle sizes from each other, an average particle size of a filler having minimum average particle size in said at least two kinds of fillers being 0.001 to 2 $\mu$m, an average particle size of a filler having maximum average particle size in said at least two kinds of fillers being more than 2 $\mu$m and not more than 15 $\mu$m, said at least two kinds of fillers having the following particle size distribution:
(a) 20 to 90% by weight of a filler having a particle size of not more than 2 $\mu$m,
(b) 0 to 15% by weight of a filler having a particle size of more than 2 $\mu$m and less than 3 $\mu$m, and
(c) 10 to 80% by weight of a filler having a particle size of not less than 3 $\mu$m.

20 Claims, No Drawings

POLYAMIDE RESIN COMPOSITION AND FILM PRODUCED FROM THE SAME

BACKGROUND OF THE INVENTION

The present invention relates to a polyamide resin composition and a film produced from the same, and more particularly, it relates to a polyamide resin composition suitable as resin for production of films, and a film having not only excellent transparency and slip property, but also mechanical properties.

Polyamide resins have been extensively used in various applications such as packages, e.g., food packaging materials and medical packaging materials, and containers because these resins are excellent in strength, flexibility, transparency, heat resistance, chemical resistance, gas-barrier property or the like. When used in these applications, the polyamide resins are molded into a desired shape by various methods.

The films used in the above-described applications are required to have excellent transparency and slip property. Therefore, various studies have been made to obtain films capable of satisfying these requirements. However, conventional polyamide films having an enhanced transparency are deteriorated in slip property between surfaces thereof, resulting in occurrence of blocking. On the contrary, those films having a good slip property are deteriorated in transparency.

As conventional polyamide resins for films, for example, in Japanese Patent Application Laid-Open (KOKAI) No. 51-34256, there is described a polyamide composition containing talc treated with a surfactant. Also, in Japanese Patent Application Laid-Open (KOKAI) No. 9-40862, there is described a polyamide resin composition containing a polyamide which is terminal-modified with hydrocarbon group, and an inorganic filler. However, when these resin compositions are formed into films by air-cooling tubular process, it is difficult to obtain such films satisfying both slip property and transparency.

Further, for example, in Japanese Patent Publication (KOKOKU) No. 51-28307, there is described the polyamide composition containing organophilic bentonite and inorganic fine particles having an average particle size of not more than 2 μm. However, when the resin composition is formed into films by the air-cooling tubular process, the obtained films are deteriorated in slip property in spite of excellent transparency.

As a result of the present inventors'earnest studies to solve the above problem, it has been found that a film produced from a polyamide resin composition containing at least two kinds of fillers having different average particle sizes from each other and specific particle size distribution is excellent in transparency, slip property and mechanical properties. The present invention has been attained on the basis of this finding.

SUMMARY OF THE INVENTION

An object of the present invention is to provide a polyamide resin composition suitable for the production of films exhibiting not only excellent transparency and slip property but also excellent mechanical properties, and a film produced from the polyamide resin composition.

To attain the above aim, in the first aspect of the present invention, there is provided a polyamide resin composition comprising 100 parts by weight of a polyamide resin and 0.001 to 2 parts by weight of at least two kinds of fillers having different average particle sizes from each other, an average particle size of a filler having minimum average particle size in said at least two kinds of fillers being 0.001 to 2 μm, an average particle size of a filler having maximum average particle size in said at least two kinds of fillers being more than 2 μm and not more than 15 μm, said at least two kinds of fillers having the following particle size distribution.

(a) 20 to 90% by weight of a filler having a particle size of not more than 2 μm, (b) 0 to 15% by weight of a filler having a particle size of more than 2 μm and less than 3 μm, and (c) 10 to 80% by weight of a filler having a particle size of not less than 3 μm.

In the second aspect of the present invention, there is provided a film comprising a polyamide resin composition comprising 100 parts by weight of a polyamide resin and 0.001 to 2 parts by weight of at least two kinds of fillers having different average particle sizes from each other, an average particle size of a filler having minimum average particle size in said at least two kinds of fillers being 0.001 to 2 μm, an average particle size of a filler having maximum average particle size in said at least two kinds of fillers being more than 2 μm and not more than 15 μm, said at least two kinds of fillers having the following particle size distribution.

(a) 20 to 90% by weight of a filler having a particle size of not more than 2 μm, (b) 0 to 15% by weight of a filler having a particle size of more than 2 μm and less than 3 μm, and (c) 10 to 80% by weight of a filler having a particle size of not less than 3 μm.

DETAILED DESCRIPTION OF THE INVENTION

The present invention will now be described in detail below.

As the polyamide resins used in the present invention, there may be exemplified those polyamides obtained by polycondensing lactams having a 3 or more-membered ring, polymerizable ω-amino acids or dibasic acids with diamine. Examples of the polyamides may include polymers of ε-caprolactam, aminocaproic acid, enanthlactam, 7-aminoheptanoic acid, 11-aminoundecanoic acid, 9-aminononanoic acid, α-pyrrolidone or α-piperidone; polymers obtained by polycondensing a diamine such as hexamethylene diamine, nonamethylene diamine, undecamethylene diamine, dodecamethylene diamine and m-xylylene diamine with a dicarboxylic acid such as terephthalic acid, isophthalic acid, adipic acid, sebacic acid, dodecane dioic acid and glutaric acid; or copolymers thereof.

Specific examples of the polyamide resins may include nylon 4, nylon 6, nylon 7, nylon 8, nylon 11, nylon 12, nylon 6.6, nylon 6.9, nylon 6.10, nylon 6.11, nylon 6.12, nylon 6T, nylon 6/6.6, nylon 6/12, nylon 6/6T, nylon 6T/6I, nylon MXD6 or the like. These polyamide resins may be used alone or in the form of a mixture of any two or more thereof. Among these polyamide resins, the preferred polyamide resins are nylon 6, copolymerized nylon 6/66 and a mixture of nylon 6 and copolymerized nylon 6/66.

The terminals of the polyamide resins may be capped with carboxylic acid or amine. For the purpose of the terminal-capping, the use of carboxylic acids having 6 to 22 carbon atoms or amines is preferred. As the carboxylic acids usable for the terminal-capping of the polyamide resins, there may be exemplified aliphatic monocarboxylic acids such as caproic acid, caprylic acid, capric acid, lauric acid, myristic acid, palmitic acid, stearic acid and behenic acid. As the amines usable for the terminal-capping of the polyamide resins, there may be exemplified aliphatic primary amines such as hexyl amine, octyl amine, decyl amine, lauryl amine, myristyl amine, palmityl amine, stearyl amine and behenyl amine; aliphatic diamines such as hexamethylene diamine; and aromatic diamines such as meta-xylene diamine. The amount of the carboxylic acid or amine used for the terminal-capping is in the range of about 20 to 40 $\mu$eq/g.

The polyamide resins used in the present invention preferably have a relative viscosity of 2.0 to 6.5 when measured at 25° C. at a concentration of 1% in 98% sulfuric acid according to JIS K6810. When the relative viscosity is less than 2.0, it may be difficult to mold the polyamide resin due to too small melting viscosity thereof. On the contrary, when the relative viscosity is more than 6.5, the polyamide resin may be insufficient in melt fluidity. The relative viscosity of the polyamide resins used in the present invention is more preferably 2.2 to 6.0.

The filler used in the present invention satisfies the following conditions (a) to (c) when the total amount of filler is 100% by weight.

(a) Content of a filler having a particle size of not more than 2 $\mu$m: 20 to 90% by weight.
(b) Content of a filler having a particle size of more than 2 $\mu$m and less than 3 $\mu$m: 0 to 15% by weight.
(c) Content of a filler having a particle size of not less than 3 $\mu$m: 10 to 80% by weight.

In order to satisfy the above particle size distribution of fillers, at least two kinds of fillers having different average particle sizes from each other are used. Further, an average particle size of a filler having minimum average particle size in said at least two kinds of fillers is 0.001 to 2 $\mu$m, and an average particle size of a filler having maximum average particle size in said at least two kinds of fillers is more than 2 $\mu$m and not more than 15 $\mu$m. It is suggested that the filler having minimum average particle size contributes an effect for decreasing the crystal size of polyamide (playing a role of a nucleating agent), as a result, transparency is imparted to the film. The filler having maximum average particle size contributes roughening the surface of the polyamide film, as a result, slipping properties is imparted to the film. When the average particle size of the filler having minimum average particle size exceeds 2 $\mu$m, the crystalline size of polyamide may be too large and the film may become opaque. When the average particle size of the filler having maximum average particle size exceeds 15 $\mu$m, the film surface is too roughened and it is not practical.

When the content of the filler having a particle size of not more than 2 $\mu$m is less than 10% by weight, the obtained film may be insufficient in transparency, and when the content of the filler having a particle size of not more than 2 $\mu$m is more than 90% by weight, the obtained film may be insufficient in slip property. When the content of the filler having a particle size of not less than 3 $\mu$m is more than 80% by weight, the obtained film may be insufficient in transparency, and when the content of the filler having a particle size of not less than 3 $\mu$m is less than 10% by weight, the obtained film may be insufficient in slip property. Also, when the content of the filler having a particle size of more than 2 $\mu$m and less than 3 $\mu$m is more than 15% by weight, the obtained film may be insufficient in both transparency and slip property.

The particle size distribution of the filler used in the present invention preferably satisfies the following conditions (a1) to (c1).

(a1) Content of a filler having a particle size of not more than 2 $\mu$m: 40 to 90% by weight.
(b1) Content of a filler having a particle size of more than 2 $\mu$m and less than 3 $\mu$m: 0 to 15% by weight.
(c1) Content of a filler having a particle size of not less than 3 $\mu$m: 10 to 60% by weight.

Meanwhile, the particle size of the filler means a diameter of sphere which is equal in the volume to that of particle of filler (diameter corresponding to sphere). The particle size distribution of the fillers is a weight particle size distribution and the median diameter is defined as the average particle size. The particle size distribution and the average particle size may be measured by known methods such as coulter counter method and laser diffraction method, or observed by an electron microscope. In the electron microscope method, the obtained photograph is subject to a image treatment, the particle size is converted to the diameter corresponding to sphere and then the particle size distribution is determined.

The total amount of the filler contained in the polyamide resin composition of the present invention is 0.001 to 2 parts by weight based on 100 parts by weight of the polyamide resin. When the amount of the filler is less than 0.001 part by weight, the obtained film may be insufficient in transparency and slip property. On the contrary, when the amount of the filler is more than 2 parts by weight, the obtained film may be deteriorated in transparency. The total amount of the filler contained in the polyamide resin composition is preferably 0.002 to 1.5 parts by weight, more preferably 0.01 to 1 part by weight based on 100 parts by weight of the polyamide resin.

As the fillers, there may be used inorganic fillers, organic fillers or mixtures thereof. Examples of the inorganic fillers may include various natural minerals or synthetics such as talc, kaolin, zeolite, bentonite, montmorillonite, calcium carbonate, zinc carbonate, wollastonite, silica, alumina, magnesium oxide, calcium silicate, sodium aluminate, sodium aluminosilicate, magnesium silicate, glass balloons, zinc oxide and hydrotalcite. Examples of the organic fillers may include particles, powders or deaggregated products of various polymers such as cross-linked polymethyl methacrylate. It is preferred that the refractive index of the filler is close to that of the polyamide in view of transparency. The refractive index of the filler is preferably 1.3 to 1.8, more preferably 1.4 to 1.7.

In order to incorporate the filler having the above-described particle size distribution into the polyamide resin, there may be used, for example, the method of using the filler having minimum average particle size of 0.001 to 2 $\mu$m and the filler having maximum average particle size of more than 2 $\mu$m and not more than 15 $\mu$m in combination and appropriately controlling the percentage between the two fillers.

Examples of the filler having minimum average particle size of 0.001 to 2 $\mu$m may include various natural minerals or synthetics such as talc, kaolin, bentonite, montmorillonite, calcium carbonate, zinc carbonate, wollastonite, alumina, magnesium oxide, calcium silicate, sodium aluminate, sodium aluminosilicate, magnesium silicate, glass balloons, zinc oxide and hydrotalcite. These filler may be used alone or in the form of a mixture of any two or more thereof.

As the filler having maximum average particle size of more than 2 $\mu$m and not more than 15 $\mu$m, there may be used inorganic fillers, e.g., various natural minerals or synthetics as such as zeolite, bentonite, montmorillonite, calcium carbonate, zinc carbonate, wollastonite, silica, alumina, magnesium oxide, calcium silicate, sodium aluminate, sodium aluminosilicate, magnesium silicate, glass balloons, zinc oxide and hydrotalcite; or organic fillers such as particles, powders or deaggregated products of various polymers such as cross-linked polymethyl methacrylate. These filler may be used alone or in the form of a mixture of any two or more thereof.

In the present invention, besides the above fillers, an organophilic bentonite can be preferably used as the filler having minimum average particle size of 0.001 to 2 μm. Further, when the organophilic bentonite is used with copolyamide resin as the polyamide, especially excellent effect can be obtained.

The organophilic bentonite is an organophilic composite containing colloidal hydrous aluminum silicate, and may be produced, for example, by treating montmorillonites as a main ingredient of bentonite with organic bases. Specifically, the organophilic bentonite is a composite of clays and organic substances which has such a structure that water or exchangeable cations mainly existing between crystals of montmorillonite having a larger base-substitution capability among clay colloids, are substituted with organic polar compounds or organic cations to impart a lipophilic property thereto. Montmorillonite is a clay mineral having a layer structure and containing silica, alumina and magnesia as main ingredients. Specific examples of the montmorillonites may include sodium montmorillonite, calcium montmorillonite or the like. The organophilic bentonite has a particle size of less than 3 μm, preferably less than 1 μm. The lower limit of the particle size thereof is 0.001 μm.

The above organic bases may be cation-exchangeable organic bases. As the organic bases, there may be exemplified higher aliphatic or aromatic primary, secondary and tertiary amines or salts thereof, or quaternary ammonium salts. Specific examples of the organic bases may include aliphatic bases such as octadecyl amine, dimethyldioctadecyl amine and trimethyloctadecyl ammonium salt; aromatic bases such as p-phenylene diamine, α-naphthyl amine, p-aminodimethyl aniline, 2,7-diaminofluorene and benzidine; heterocyclic aromatic bases having nitrogen atoms such as piperidine; or the like. These organic bases may be used alone or in the form of a mixture of any two or more thereof. Among these organic bases, trimethyloctadecyl ammonium salt and/or dimethyldioctadecyl ammonium salt are preferred.

Preferred filler having minimum average particle size of 0.001 to 2 μm, is at least one selected from the group consisting of talc, kaolin and organophilic bentonite from the standpoint of good transparency of the obtained film. Preferred filler having maximum average particle size of more than 2 μm and not more than 15 μm is at least one selected from the group consisting of zeolite, silica and cross-linked polymethyl methacrylate from the standpoint of good slip property.

The polyamide resin composition of the present invention may optionally contain additives such as lubricants, mold-release agents, anti-thermal degradation agents, ultraviolet light absorbers, antistatic agents, anti-blocking agents, dyes, pigments, flame retardants and spreaders unless the addition thereof adversely affects the effects of the present invention. The filler and, if required, the other additives may be blended in the polyamide resin by any optional method, e.g., a method of adding these components to the polyamide resin during the polymerization process, a method of dry-blending these components with the polyamide resin obtained after the polymerization process, a method of melt-kneading these components together with the polyamide resin, a method of preparing a high-concentration master batch and diluting the master batch upon molding, or the like.

In the case where the film of the present invention is in the form of a single-layer film, the film may be produced from the polyamide resin composition of the present invention by known methods, for example, sheet molding method, flat process, air-cooling tubular process, water-cooling tubular process or the like. Among these methods, the air-cooling tubular process and flat process are preferred.

The film of the present invention may also be in the form of a laminated film. In this case, as film materials to be laminated on the film made of the polyamide resin composition, there may be used thermoplastic resins other than the polyamide resin used in the composition of the present invention. Examples of the thermoplastic resins may include polyamide resins, ethylene-vinyl alcohol copolymer resins, semi-aromatic polyamide resins, polyvinylidene chloride resins, polyethylene resins, polypropylene resins, ethylene-vinyl acetate copolymer resins, polyester resins or the like.

The laminated film may be produced by so-called co-extrusion methods, e.g., co-extrusion sheet molding method, co-extrusion flat process, co-extrusion air-cooling tubular process or co-extrusion water-cooling tubular process, or by the method of laminating the obtained single-layer film on the other film by lamination method. Among these methods, the co-extrusion flat process and co-extrusion air-cooling tubular process are preferred.

The film of the present invention may be in the form of an oriented film, and may be produced, for example, by stretching a film-like molded product. As the stretching method, there may be used any known methods, for example, a sequential biaxially-stretching method including the steps of roll-stretching the film obtained by flat process in the machine direction and then tenter-stretching the resultant film in the transverse direction. As to tubular film obtained by molding the resin through a circular die, there may be used a tubular orientation process capable of stretching the tubular film in both machine and transverse directions at the same time, in addition to the above sequential biaxially-stretching method.

The single-layer film of the present invention has a thickness of about 10 to 300 μm. In the case of the laminated film, the film made of the polyamide resin composition of the present invention has a thickness of usually 5 to 150 μm. The total thickness of the laminated film is usually 15 to 500 μm. When the thickness of the film is too large, the film tends to be deteriorated in transparency. On the other hand, when the thickness of the film is too small, the film tends to be deteriorated in pinhole resistance. Also, one or both surfaces of the film of the present invention may be subjected to corona treatment before use in order to improve printability or laminating property thereof.

In case where the film thickness is 30 μm, the film of the present invention preferably has a haze of not more than 25%. When the haze of the film is more than 25%, the obtained film may be insufficient in transparency, resulting in poor product quality. When nylon 6 is used as the polyamide resin, the obtained film preferably has a haze of preferably not more than 23%. When copolymerized nylon 6/66 is used as the polyamide resin, the obtained film is generally required to have a higher transparency than that of the film produced from nylon 6 and, therefore, has more preferably a haze of not more than 10%.

The film of the present invention has a static friction coefficient of preferably not more than 1.2. When the static friction coefficient of the film is too high, the obtained film tends to be insufficient in slip property, resulting in occurrence of blocking.

The static friction coefficient of the film produced by using nylon 6 as the polyamide resin, is preferably not more than 1.0, more preferably not more than 0.8. Also, the film produced by using the copolymerized nylon 6/66 as the polyamide resin usually has a higher static friction coefficient than that of the film produced from nylon 6. The static friction coefficient of the film produced from the copolymerized nylon 6/66 is preferably not more than 1.2, more preferably not more than 1.0.

The polyamide resin composition of the present invention can provide a resin material suitable for films which are excellent in transparency, slip property and mechanical properties and, therefore, can be applied to the production of various films. The film of the present invention is excellent in not only transparency and slip property, but also breaking strength, elastic modulus and pinhole resistance and, therefore, can be suitably used for the production of various packaging materials.

EXAMPLES

The present invention will be described in more detail below by reference to the following examples. However, these examples are only illustrative and not intended to limit the present invention thereto.

Meanwhile, raw materials used in the following Examples and Comparative Examples are as follows.

(1) Polyamide resin 1: Copolymerized nylon 6/66 produced by Mitsubishi Engineering-Plastics Corporation; grade name: 2030J; relative viscosity: 4.5 (hereinafter referred to merely as "PA1")

(2) Polyamide resin 2: nylon 6 produced by Mitsubishi Engineering-Plastics Corporation; grade name: 1030J; relative viscosity: 4.5 (hereinafter referred to merely as "PA2")

(3) Filler 1: talc; "SG2000" produced by Nippon Talc Co., Ltd.; average particle size: 0.9 $\mu$m; refractive index: 1.55

(4) Filler 2: kaolin; "ASP200" produced by Engelhard Corp.; average particle size: 0.4 $\mu$m; refractive index: 1.55

(5) Filler 3: zeolite; "SILTON AMT-50" produced by Mizusawa Kagaku Kogyo Co., Ltd.; average particle size: 5.5 $\mu$m; refractive index: 1.5

(6) Filler 4: cross-linked PMMA; "EPOSTAR" produced by Nihon Shokubai Co., Ltd.; average particle size: 6.0 $\mu$m; refractive index: 1.5

(7) Filler 5: talc; "MICRONWHITE#5000A" produced by Hayashi Kasei Co., Ltd.; average particle size: 4.1 $\mu$m; refractive index: 1.55

(8) Filler 6: organophilic bentonite; "NEW D ORBEN" produced by Shiraishi Kogyo Co., Ltd.; average particle size: not more than 1.0 $\mu$m; refractive index: 1.5

(9) Filler 7: organophilic bentonite; "ORBEN" produced by Shiraishi Kogyo Co., Ltd.; average particle size: not more than 1.0 $\mu$m; refractive index: 1.5

(10) Filler 8: silica; Sylysia 770 produced by Fuji Sylysia Chemical Co., Ltd.; average particle size: 6.0 $\mu$m; refractive index: 1.46

TABLE 1

| Fillers | Kind | Average particle size ($\mu$m) | Particle size distribution (d) (wt %) | | |
|---|---|---|---|---|---|
| | | | d $\leq$ 2 $\mu$m | 2 $\mu$m < d < 3 $\mu$m | d $\geq$ 3 $\mu$m |
| Filler 1 | Talc | 0.9 | 87 | 10 | 3 |
| Filler 2 | Kaolin | 0.4 | 92 | 4 | 4 |
| Filler 3 | Zeolite | 5.5 | 1 | 6 | 93 |
| Filler 4 | PMMA | 6.0 | 3 | 5 | 92 |
| Filler 5 | Talc | 4.1 | 16 | 20 | 64 |
| Filler 6 | Organophilic bentonite | $\leq$1.0 | 100 | 0 | 0 |
| Filler 7 | Organophilic bentonite | $\leq$1.0 | 100 | 0 | 0 |
| Filler 8 | Silica | 6.0 | 4 | 10 | 86 |

(10) Adhesive resin 1: Polyolefin-based adhesive resin; "MODIC AP" produced by Mitsubishi Chemical Corporation; grade name: L102

(11) Polyolefin resin 1: Low-density polyethylene resin produced by Japan Polychem Corporation; grade name: LF243M Evaluation methods used in the following Examples and Comparative Examples are as follows.

(12) Evaluation of transparency:

The transparency of the film was evaluated by measuring a haze value thereof using a haze meter manufactured by Tokyo Denshoku Co., Ltd.

(13) Evaluation of slip property:

The slip property of the film was evaluated by measuring a static friction coefficient between outer surfaces thereof using a friction meter "TR-type" manufactured by Toyo Seiki Co., Ltd. according to ASTM D1894.

(14) Evaluation of tensile modulus and tensile break strength:

The tensile modulus and tensile break strength of the film were evaluated by measuring elastic modulus and breaking strength thereof according to JIS K7127 using "TENSI-LON" manufactured by Orientec Co., Ltd.

(15) Measurement of particle size distribution:

The particle size distribution of filler 1 was measured by a laser diffraction-type particle size distribution analyzer (SALD-2100 type) manufactured by Shimadzu Corporation.

The particle size distributions of fillers 6 and 7 were determined by a scanning electron microscope (S-2500) manufactured by Hitachi Ltd. In the photograph of scanning electron microscope, no particles having particle size of more than 2 $\mu$m was observed and the average particle size was determined as not more than 1 $\mu$m. The particle size distributions of other fillers were measured by coulter counter method. In Examples and Comparative Examples, the particle size distributions of the blended fillers were calculated with particle size distribution and blended amount of each filler because there is substantially no change the particle size distributions before and after blended.

Example 1

100 parts by weight of the polyamide resin 1 was dry-blended with 0.1 part by weight of the filler 1 and 0.05 part by weight of the filler 3 to obtain a polyamide resin composition. The thus obtained polyamide resin composition was subjected to air-cooling tubular process at 230° C. using a single-layer tubular film-forming apparatus manufactured by PLACO Co., Ltd. to obtain a single-layer polyamide resin film having a thickness of 30 μm. The evaluation results are shown in Table 2.

Example 2

The same procedure as defined in Example 1 was conducted except that the filler 2 was used instead of the filler 1, thereby producing a polyamide resin composition and then obtaining a single-layer polyamide resin film having a thickness of 30 μm therefrom. The evaluation results are shown in Table 2.

Example 3

The same procedure as defined in Example 1 was conducted except that 0.025 part by weight of the filler 4 was used instead of 0.05 part by weight of the filler 3, thereby producing a polyamide resin composition and then obtaining a single-layer polyamide resin film having a thickness of 30 μm therefrom. The evaluation results are shown in Table 2.

Example 4

100 parts by weight of the polyamide resin 1 was dry-blended with 0.1 part by weight of the filler 1 and 0.05 part by weight of the filler 3 to obtain a polyamide resin composition. The thus obtained polyamide resin composition, the adhesive resin 1 and the polyolefin resin 1 which were respectively used for outside, intermediate and inside layers, were subjected to co-extrusion air-cooling tubular process at 230° C. using a three-layer tubular film-forming apparatus manufactured by PLACO Co., Ltd., thereby obtaining a laminated polyamide resin film having a thickness of 50 μm. It was confirmed that the thicknesses of the outside, intermediate and inside layers of the obtained laminated film were 30 μm, 5 μm and 15 μm, respectively. The evaluation results are shown in Table 2.

Comparative Example 1

The same procedure as defined in Example 1 was conducted except that only the polyamide resin 1 was subjected to the air-cooling tubular process, thereby obtaining a single-layer polyamide resin film having a thickness of 30 μm. The evaluation results are shown in Table 2.

Comparative Example 2

The same procedure as defined in Example 1 was conducted except that the filler 3 was not blended in the composition, thereby obtaining a single-layer polyamide resin film having a thickness of 30 μm. The evaluation results are shown in Table 2.

Comparative Example 3

The same procedure as defined in Example 1 was conducted except that the filler 1 was not blended in the composition, thereby obtaining a single-layer polyamide resin film having a thickness of 30 μm. The evaluation results are shown in Table 2.

Comparative Example 4

The same procedure as defined in Example 1 was conducted except that the filler 5 was used instead of the filler 1, thereby obtaining a single-layer polyamide resin film having a thickness of 30 μm. The evaluation results are shown in Table 2.

TABLE 2

|  | Ex. 1 | Ex. 2 | Ex. 3 | Ex. 4 |
| --- | --- | --- | --- | --- |
| Kind of PA resin | PA1 | PA1 | PA1 | PA1 |
| Filler A |  |  |  |  |
| Kind | Filler 1 | Filler 2 | Filler 1 | Filler 1 |
| Amount (wt. part) | 0.1 | 0.1 | 0.1 | 0.1 |
| Filler B |  |  |  |  |
| Kind | Filler 3 | Filler 3 | Filler 4 | Filler 3 |
| Amount (wt. part) | 0.05 | 0.05 | 0.025 | 0.05 |
| Total amount of filler added (wt. part) | 0.15 | 0.15 | 0.125 | 0.15 |
| Particle size distribution (d) (wt. %) |  |  |  |  |
| $d \leq 2\ \mu m$ | 58 | 62 | 70 | 58 |
| $2\ \mu m < d < 3\ \mu m$ | 9 | 5 | 9 | 9 |
| $d \geq 3\ \mu m$ | 33 | 33 | 21 | 33 |
| Structure of film | Single layer | Single layer | Single layer | Laminated |
| Haze (%) | 8 | 8 | 8 | 9 |
| Static friction coefficient | 0.7 | 0.7 | 0.7 | 0.7 |
| Elastic modulus (MPa) | 350 | — | — | — |
| Breaking strength (MPa) | 110 | — | — | — |
|  | Comp. Ex. 1 | Comp. Ex. 2 | Comp. Ex. 3 | Comp. Ex. 4 |
| Kind of PA resin | PA1 | PA1 | PA1 | PA1 |
| Filler A |  |  |  |  |
| Kind | None | Filler 1 | None | Filler 5 |
| Amount (wt. part) | — | 0.1 | — | 0.1 |
| Filler B |  |  |  |  |
| Kind | None | None | Filler 3 | Filler 3 |
| Amount (wt. part) | — | — | 0.05 | 0.05 |
| Total amount of filler added (wt. part) | — | 0.1 | 0.05 | 0.15 |
| Particle size distribution (d) (wt. %) |  |  |  |  |
| $d \leq 2\ \mu m$ | — | 87 | 1 | 11 |
| $2\ \mu m < d < 3\ \mu m$ | — | 10 | 6 | 15 |
| $d \geq 3\ \mu m$ | — | 3 | 93 | 74 |
| Structure of film | Single layer | Single layer | Single layer | Single layer |
| Haze (%) | 18 | 8 | 12 | 12 |
| Static friction coefficient | 1.5 | 1.5 | 0.7 | 0.7 |
| Elastic modulus (MPa) | 300 | — | — | — |
| Breaking strength (MPa) | 110 | — | — | — |

Example 5

100 parts by weight of the polyamide resin 2 was dry-blended with 0.06 part by weight of the filler 1 and 0.03 part by weight of the filler 3 to obtain a polyamide resin composition. The thus obtained polyamide resin composition was subjected to air-cooling tubular process at 250° C. using a single-layer tubular film-forming apparatus manufactured by PLACO Co., Ltd. to obtain a single-layer polyamide resin film having a thickness of 30 μm. The evaluation results are shown in Table 3.

Example 6

The same procedure as defined in Example 5 was conducted except that the filler 2 was used instead of the filler 1, thereby producing a polyamide resin composition and then obtaining a single-layer polyamide resin film having a thickness of 30 μm therefrom. The evaluation results are shown in Table 3.

Example 7

100 parts by weight of the polyamide resin 2 was dry-blended with 0.06 part by weight of the filler 1 and 0.03 part by weight of the filler 3 to obtain a polyamide resin composition. The thus obtained polyamide resin composition, the adhesive resin 1 and the polyolefin resin 1 which were respectively used for outside, intermediate and inside layers, were subjected to co-extrusion air-cooling tubular process at 250° C. using a three-layer tubular film-forming apparatus manufactured by PLACO Co., Ltd., thereby obtaining a laminated polyamide resin film having a thickness of 50 μm. It was confirmed that the thicknesses of the outside, intermediate and inside layers of the obtained laminated film were 30 μm, 5 μm and 15 μm, respectively. The evaluation results are shown in Table 3.

Comparative Example 5

The same procedure as defined in Example 5 was conducted except that only the polyamide resin 2 was subjected to the air-cooling tubular process, thereby obtaining a single-layer polyamide resin film having a thickness of 30 μm. The evaluation results are shown in Table 3.

TABLE 3

|  | Ex. 5 | Ex. 6 | Ex. 7 | Comp. Ex. 5 |
|---|---|---|---|---|
| Kind of PA resin | PA2 | PA2 | PA2 | PA2 |
| Filler A |  |  |  |  |
| Kind | Filler 1 | Filler 2 | Filler 1 | None |
| Amount (wt. part) | 0.06 | 0.06 | 0.06 | — |
| Filler B |  |  |  |  |
| Kind | Filler 3 | Filler 3 | Filler 3 | None |
| Amount (wt. part) | 0.03 | 0.03 | 0.03 | — |
| Total amount of filler added (wt. part) | 0.09 | 0.09 | 0.09 | — |
| Particle size distribution (d) (wt. %) |  |  |  |  |
| $d \leq 2\ \mu m$ | 58 | 62 | 58 | — |
| $2\ \mu m < d < 3\ \mu m$ | 9 | 5 | 9 | — |
| $d \geq 3\ \mu m$ | 33 | 33 | 33 | — |
| Structure of film | Single layer | Single layer | Laminated layer | Single |
| Haze (%) | 15 | 20 | 17 | 31 |
| Static friction coefficient | 0.6 | 0.5 | 0.6 | 1.0 |
| Elastic modulus (MPa) | 620 | — | — | 500 |
| Breaking strength (MPa) | 110 | — | — | 110 |

Example 8

100 parts by weight of the polyamide resin 1 was dry-blended with 0.05 part by weight of the filler 6 and 0.04 part by weight of the filler 3 to obtain a polyamide resin composition. The thus obtained polyamide resin composition was subjected to air-cooling tubular process at 230° C. using a single-layer tubular film-forming apparatus manufactured by PLACO Co., Ltd. to obtain a single-layer polyamide resin film having a thickness of 30 μm. The evaluation results are shown in Table 4.

Example 9

The same procedure as defined in Example 8 was conducted except that the filler 7 was used instead of the filler 6, thereby producing a polyamide resin composition and then obtaining a single-layer polyamide resin film having a thickness of 30 μm therefrom. The evaluation results are shown in Table 4.

Example 10

The same procedure as defined in Example 8 was conducted except that 0.02 part by weight of the filler 4 was used instead of 0.04 part by weight of the filler 3, thereby producing a polyamide resin composition and then obtaining a single-layer polyamide resin film having a thickness of 30 μm therefrom. The evaluation results are shown in Table 4.

Example 11

100 parts by weight of the polyamide resin 1 was dry-blended with 0.05 part by weight of the filler 6 and 0.04 part by weight of the filler 3 to obtain a polyamide resin composition. The thus obtained polyamide resin composition, the adhesive resin 1 and the polyolefin resin 1 which were respectively used for outside, intermediate and inside layers, were subjected to co-extrusion air-cooling tubular process at 230° C. using a three-layer tubular film-forming apparatus manufactured by PLACO Co., Ltd., thereby obtaining a laminated polyamide resin film having a thickness of 50 μm. It was confirmed that the thicknesses of the outside, intermediate and inside layers of the obtained laminated film were 30 μm, 5 μm and 15 μm, respectively. The evaluation results are shown in Table 4.

Example 12

The same procedure as defined in Example 11 was conducted except that the filler 7 was used instead of the filler 6, thereby producing a polyamide resin composition and then obtaining a laminated polyamide resin film having a thickness of 50 μm. It was confirmed that the thicknesses of the outside, intermediate and inside layers of the obtained laminated film were 30 μm, 5 μm and 15 μm, respectively. The evaluation results are shown in Table 4.

Comparative Example 6

The same procedure as defined in Example 8 was conducted except that the filler 6 was not blended in the composition, thereby obtaining a single-layer polyamide resin film having a thickness of 30 μm. The evaluation results are shown in Table 4.

Comparative Example 7

The same procedure as defined in Example 8 was conducted except that the filler 2 was used instead of the filler 3, thereby obtaining a single-layer polyamide resin film having a thickness of 30 μm. The evaluation results are shown in Table 4.

TABLE 4

|  | Ex. 8 | Ex. 9 | Ex. 10 |
|---|---|---|---|
| Kind of PA resin | PA1 | PA1 | PA1 |
| Filler A |  |  |  |
| Kind | Filler 6 | Filler 7 | Filler 6 |
| Amount (wt. part) | 0.05 | 0.05 | 0.05 |
| Filler B |  |  |  |
| Kind | Filler 3 | Filler 3 | Filler 4 |
| Amount (wt. part) | 0.04 | 0.04 | 0.02 |
| Total amount of filler added (wt. part) | 0.09 | 0.09 | 0.07 |

TABLE 4-continued

| Particle size distribution (d) (wt. %) | | | |
|---|---|---|---|
| d ≤ 2 μm | 56 | 56 | 72 |
| 2 μm < d < 3 μm | 3 | 3 | 2 |
| d ≥ 3 μm | 41 | 41 | 26 |
| Structure of film | Single layer | Single layer | Single layer |
| Haze (%) | 3 | 3 | 3 |
| Static friction coefficient | 0.7 | 0.7 | 0.7 |
| Elastic modulus (MPa) | 330 | 330 | — |
| Breaking strength (MPa) | 110 | 110 | — |

| | Ex. 11 | Ex. 12 |
|---|---|---|
| Kind of PA resin | PA1 | PA1 |
| Filler A | | |
| Kind | Filler 6 | Filler 7 |
| Amount (wt. part) | 0.05 | 0.05 |
| Filler B | | |
| Kind | Filler 3 | Filler 3 |
| Amount (wt. part) | 0.04 | 0.04 |
| Total amount of filler added (wt. part) | 0.09 | 0.09 |
| Particle size distribution (d) (wt. %) | | |
| d ≤ 2 μm | 56 | 56 |
| 2 μm < d < 3 μm | 3 | 3 |
| d ≥ 3 μm | 41 | 41 |
| Structure of film | Laminated | Laminated |
| Haze (%) | 5 | 5 |
| Static friction coefficient | 0.7 | 0.7 |
| Elastic modulus (MPa) | — | — |
| Breaking strength (MPa) | — | — |

| | Comp. Ex. 6 | Comp. Ex. 7 |
|---|---|---|
| Kind of PA resin | PA1 | PA1 |
| Filler A | | |
| Kind | Filler 6 | Filler 6 |
| Amount (wt. part) | 0.05 | 0.05 |
| Filler B | | |
| Kind | None | Filler 2 |
| Amount (wt. part) | — | 0.04 |
| Total amount of filler added (wt. part) | 0.05 | 0.09 |
| Particle size distribution (d) (wt. %) | | |
| d ≤ 2 μm | 100 | 96 |
| 2 μm < d < 3 μm | 0 | 2 |
| d ≥ 3 μm | 0 | 2 |
| Structure of film | Single layer | Single layer |
| Haze (%) | 3 | 3 |
| Static friction coefficient | 2.5 | 2.0 |
| Elastic modulus (MPa) | — | — |
| Breaking strength (MPa) | — | — |

Example 13

100 parts by weight of the polyamide resin 2 was dry-blended with 0.05 part by weight of the filler 6 and 0.03 part by weight of the filler 3 to obtain a polyamide resin composition. The thus obtained polyamide resin composition was subjected to air-cooling tubular process at 250° C. using a single-layer tubular film-forming apparatus manufactured by PLACO Co., Ltd. to obtain a single-layer polyamide resin film having a thickness of 30 μm. The evaluation results are shown in Table 5.

Example 14

The same procedure as defined in Example 13 was conducted except that 0.02 part by weight of the filler 4 was used instead of 0.03 part by weight of the filler 3, thereby producing a polyamide resin composition and then obtaining a single-layer polyamide resin film having a thickness of 30 μm therefrom. The evaluation results are shown in Table 5.

Example 15

100 parts by weight of the polyamide resin 2 was dry-blended with 0.05 part by weight of the filler 6 and 0.03 part by weight of the filler 3 to obtain a polyamide resin composition. The thus obtained polyamide resin composition, the adhesive resin 1 and the polyolefin resin 1 which were respectively used for forming outside, intermediate and inside layers, were subjected to co-extrusion air-cooling tubular process at 250° C. using a three-layer tubular film-forming apparatus manufactured by PLACO Co., Ltd., thereby obtaining a laminated polyamide resin film having a thickness of 50 μm. It was confirmed that the thicknesses of the outside, intermediate and inside layers of the obtained laminated film were 30 μm, 5 μm and 15 μm, respectively. The evaluation results are shown in Table 5.

Example 16

The same procedure as defined in Example 13 was conducted except that the filler 8 was used instead of the filler 3, thereby obtaining a single-layer polyamide resin film having a thickness of 30 μm. The evaluation results are shown in Table 5.

TABLE 5

| | Ex. 13 | Ex. 14 |
|---|---|---|
| Kind of PA resin | PA2 | PA2 |
| Filler A | | |
| Kind | Filler 6 | Filler 6 |
| Amount (wt. part) | 0.05 | 0.05 |
| Filler B | | |
| Kind | Filler 3 | Filler 4 |
| Amount (wt. part) | 0.03 | 0.02 |
| Total amount of filler added (wt. part) | 0.08 | 0.07 |
| Particle size distribution (d) (wt. %) | | |
| d ≤ 2 μm | 63 | 72 |
| 2 μm < d < 3 μm | 2 | 2 |
| d ≥ 3 μm | 35 | 26 |
| Structure of film | Single layer | Single layer |
| Haze (%) | 20 | 20 |
| Static friction coefficient | 0.6 | 0.6 |
| Elastic modulus (MPa) | 580 | — |
| Breaking strength (MPa) | 110 | — |

| | Ex. 15 | Ex. 16 |
|---|---|---|
| Kind of PA resin | PA2 | PA2 |
| Filler A | | |
| Kind | Filler 6 | Filler 6 |
| Amount (wt. part) | 0.05 | 0.05 |
| Filler B | | |
| Kind | Filler 3 | Filler 8 |
| Amount (wt. part) | 0.03 | 0.03 |
| Total amount of filler added (wt. part) | 0.08 | 0.08 |

TABLE 5-continued

| Particle size distribution (d) (wt. %) | | |
|---|---|---|
| d ≤ 2 μm | 63 | 64 |
| 2 μm < d < 3 μm | 2 | 4 |
| d ≥ 3 μm | 35 | 32 |
| Structure of film | Laminated | Single layer |
| Haze (%) | 23 | 20 |
| Static friction coefficient | 0.6 | 0.6 |
| Elastic modulus (MPa) | — | — |
| Breaking strength (MPa) | — | — |

What is claimed is:

1. A polyamide resin composition comprising 100 parts by weight of a polyamide resin and 0.001 to 2 parts by weight of at least two kinds of fillers having different average particle sizes from each other,
an average particle size of a filler having minimum average particle size in said at least two kinds of fillers being 0.001 to 2 μm,
an average particle size of a filler having maximum average particle size in said at least two kinds of fillers being more than 2 μm and not more than 15 μm,
said at least two kinds of fillers having the following particle size distribution:
(a) 20 to 90% by weight of a filler having a particle size of not more than 2 μm.
(b) 0 to 15% by weight of a filler having a particle size of more than 2 μm and less than 3 μm, and
(c) 10 to 80% by weight of a filler having a particle size of not less than 3 μm.

2. A polyamide resin composition according to claim 1, wherein said filler having minimum average particle size is selected from the group consisting of talc, kaolin and organophilic bentonite.

3. A polyamide resin composition according to claim 1, wherein said filler having maximum average particle size is selected from the group consisting of zeolite, silica and cross-linked polymethyl methacrylate.

4. A polyamide resin composition according to claim 1, wherein said filler having minimum average particle size is selected from the group consisting of talc, kaolin and organophilic bentonite and said filler having maximum average particle size is selected from the group consisting of zeolite, silica and cross-linked polymethyl methacrylate.

5. A polyamide resin composition according to claim 1, wherein said polyamide resin is nylon 6, copolymerized nylon 6/66 or mixture thereof.

6. A polyamide resin composition according to claim 2, wherein said polyamide resin is nylon 6, copolymerized nylon 6/66 or mixture thereof.

7. A polyamide resin composition according to claim 3, wherein said polyamide resin is nylon 6, copolymerized nylon 6/66 or mixture thereof.

8. A polyamide resin composition according to claim 4, wherein said polyamide resin is nylon 6, copolymerized nylon 6/66 or mixture thereof.

9. A film comprising a polyamide resin composition comprising 100 parts by weight of a polyamide resin and 0.001 to 2 parts by weight of at least two kinds of fillers having different average particle sizes from each other,
an average particle size of a filler having minimum average particle size in said at least two kinds of fillers being 0.001 to 2 μm,
an average particle size of a filler having maximum average particle size in said at least two kinds of fillers being more than 2μm and not more than 15 μm,
said at least two kinds of fillers having the following particle size distribution:
(a) 20 to 90% by weight of a filler having a particle size of not more than 2 μm,
(b) 0 to 15% by weight of a filler having a particle size of more than 2 μm and less than 3 μm, and
(c) 10 to 80% by weight of a filler having a particle size of not less than 3 μm.

10. A film according to claim 9, wherein said filler having minimum average particle size is selected from the group consisting of talc, kaolin and organophilic bentonite.

11. A film according to claim 9, wherein said filler having maximum average particle size is selected from the group consisting of zeolite, silica and cross-linked polymethyl methacrylate.

12. A film according to claim 9, wherein said filler having minimum average particle size is selected from the group consisting of talc, kaolin and organophilic bentonite and said filler having maximum average particle size is selected from the group consisting of zeolite, silica and cross-linked polymethyl methacrylate.

13. A film according to claim 9, wherein said polyamide resin is nylon 6, copolymerized nylon 6/66 or mixture thereof.

14. A film according to claim 12, wherein said polyamide resin is nylon 6, copolymerized nylon 6/66 or mixture thereof.

15. A film according to claim 9, which further comprises a layer comprising a thermoplastic resin other than the polyamide resin used in said composition.

16. A film according to claim 14, which further comprises a layer comprising a thermoplastic resin other than the polyamide resin used in said composition.

17. A film according to claim 9, which is produced by an air-cooling tubular process.

18. A film according to claim 14, which is produced by an air-cooling tubular process.

19. A film according to claim 15, which is produced by an air-cooling tubular process.

20. A film according to claim 16, which is produced by an air-cooling tubular process.

* * * * *

UNITED STATES PATENT AND TRADEMARK OFFICE
CERTIFICATE OF CORRECTION

PATENT NO. : 6,313,209 B1
DATED : November 6, 2001
INVENTOR(S) : H. Urabe et al.

It is certified that error appears in the above-identified patent and that said Letters Patent is hereby corrected as shown below:

<u>Title page,</u>
Item [30], Foreign Application Priority Data, please change,
"Feb. 18, 2000  (JP) ......................................... 12-040421
 Jun. 22, 2000  (JP) ......................................... 12-187432"
to
-- Feb. 18, 2000 (JP) ......................................... 2000-040421
   Jun. 22, 2000 (JP) ......................................... 2000-187432 --

Signed and Sealed this

Thirtieth Day of April, 2002

Attest:

Attesting Officer

JAMES E. ROGAN
*Director of the United States Patent and Trademark Office*